March 22, 1955   H. J. VENNES   2,704,601
ELECTRICAL TESTING APPARATUS
Filed June 14, 1952   3 Sheets-Sheet 1

INVENTOR
H. J. VENNES
BY *[signature]*
ATTORNEY

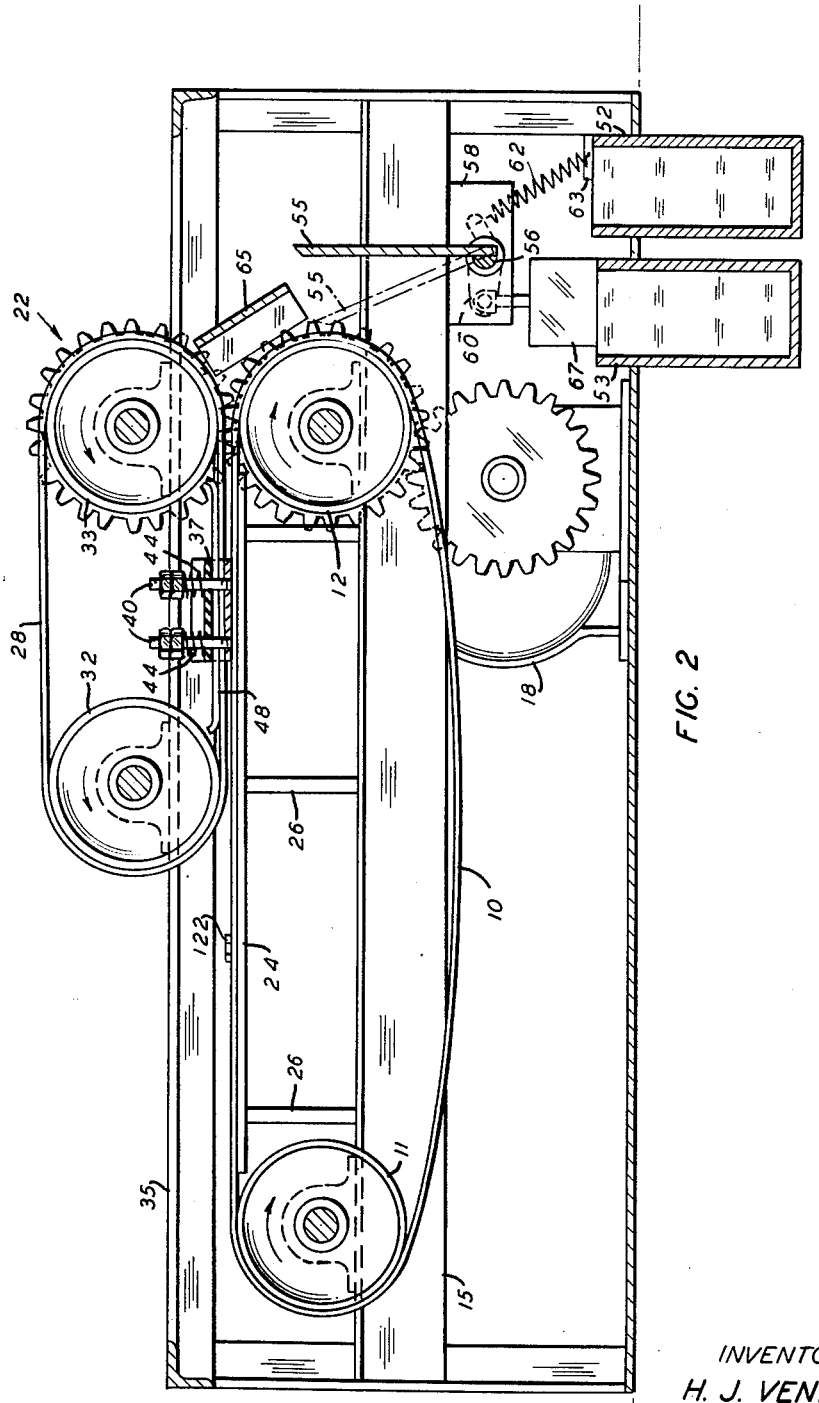

United States Patent Office 2,704,601
Patented Mar. 22, 1955

2,704,601

ELECTRICAL TESTING APPARATUS

Harald J. Vennes, Towson, Md., assignor to Western Electric Company, Incorporated, New York, N. Y., a corporation of New York Application June 14, 1952, Serial No. 293,703

9 Claims. (Cl. 209—81)

This invention relates to electrical testing apparatus, and more particularly to apparatus for testing the continuity of insulated electrical cords.

In the manufacture of insulated electrical cords having a single tinsel conductor, defects occasionally occur which affect the electrical continuity of a cord. Since it is essential that defective cords be detected and separated from nondefective cords, continuity tests must be performed on the individual cords in order to determine accurately which of them are defective. The problem of testing the cords is complicated by the fact that the cords are made in various lengths.

Prior to this invention a suitable test apparatus was not available and such continuity tests were performed manually. The former practice was to connect one end of a cord to a source of E. M. F., such as a dry cell, and using a probe connected to the other side of the source of E. M. F. to contact the other end of the cord with the probe. The probe is provided with a series-connected signaling device, such as a lamp, which will indicate a completed circuit if the cord is continuous. However, the aforementioned method of testing cords has proved time-consuming and tedious. Hence, it is desirable to provide an automatic testing apparatus which does not require the constant attention of an operator.

It is an object of this invention to provide new and improved electrical testing apparatus.

Another object of this invention is to provide new and improved apparatus for testing the continuity of insulated electrical cords.

Other objects of this invention will become apparent as the specification proceeds.

An apparatus embodying certain features of this invention may include a continuous conveyer belt for transporting a conductor transversely disposed thereupon, and a pair of spacedly mounted spring-pressed contactors normally insulated from each other. The contactors are positioned above the belt and spaced therefrom so as to permit the passage of a conductor carried by the conveyer belt therebeneath while maintaining continuous electrical contacts simultaneously with the opposite ends of the conductor.

A complete understanding of the invention may be had from the following detailed description of a specific embodiment thereof, when taken in conjunction with the appended drawings in which:

Fig. 2 is an enlarged vertical section taken along line 2—2 of Fig. 1;

Figure 1:
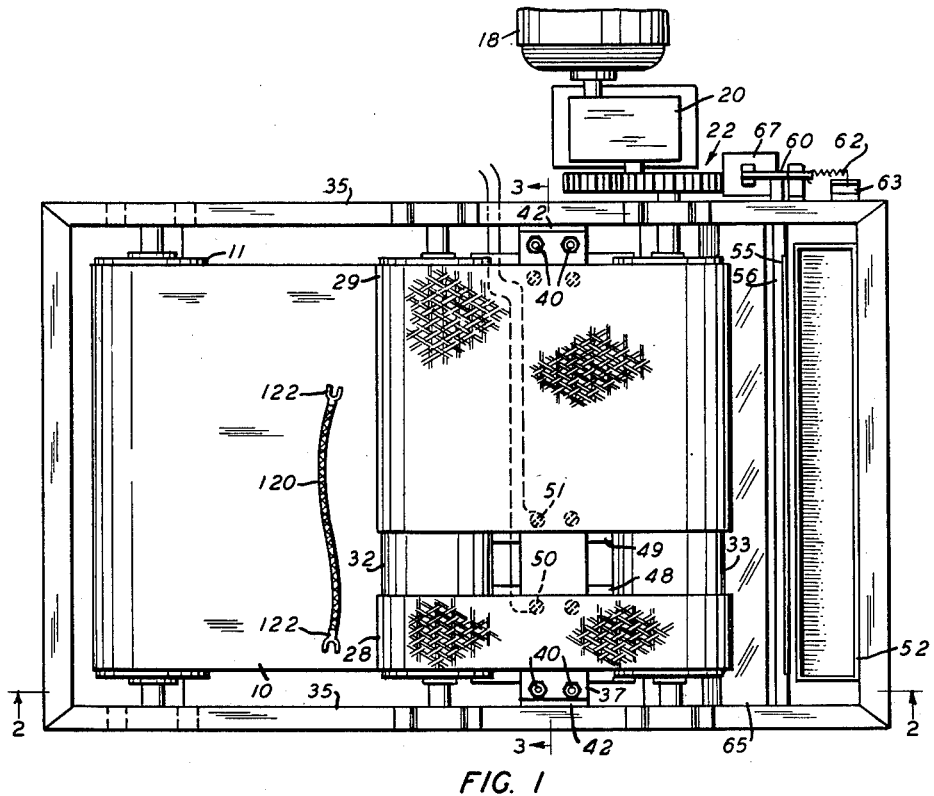
Fig. 1 is a top plan view of the apparatus.

Referring now to Fig. 1 of the drawings, the apparatus includes and endless canvas conveyer belt 10, which travels around drums 11 and 12 rotatably mounted between longitudinal members of a frame assembly, one of which designated 15 is shown. The drum 12 is operatively connected to a constant speed motor 18 through a gear reducer 20 and a gear train, shown generally at 22. Upon energization of the motor 18, the drum 12 is continuously driven in a clockwise direction, as seen in Fig. 2, to advance the conveyer belt 10 in the same direction about the freely rotatable drum 11. On the upper leg of its continuous path, the conveyer belt 10 is supported by a planar backing plate 24, which lends rigidity thereto. The backing plate 24 is mounted on supports 26—26 secured to the longitudinal members 15—15. The backing plate 24 supports the belt 10 from a point proximate to that at which the belt 10 leaves the periphery of the drum 11 to a point proximate to that at which the belt approaches the periphery of the drum 12.

Mounted above the conveyer belt 10 and spaced therefrom are a pair of endless, flexible, metallic belts 28 and 29. A belt suitable for the aforementioned purposes is the Duplex belt manufactured by The Cambridge Wire Cloth Co., Cambridge, Maryland. The belts 28 and 29 are carried by drums 32 and 33, which are made of insulating material and are rotatably mounted between longitudinal members 35—35 of the frame assembly for rotation about axes parallel to those of the drums 11 and 12. The drum 33 is driven in a counterclockwise direction by the motor 18 through the gear reducer 20 and the gear train 22 at a rotational speed equal to that of the drum 12. Since the outer diameter of the drum 33 is equal to that of the drum 12, the linear speeds of the metallic belts 28 and 29 are equal to the linear speed of the conveyor belt 10. The metallic belts 28 and 29 are mounted separately and spacedly on the drums 32 and 33 and are electrically insulated from each other. The width of the metallic belt 29 is somewhat less than that of the metallic belt 28.

Figure 3:
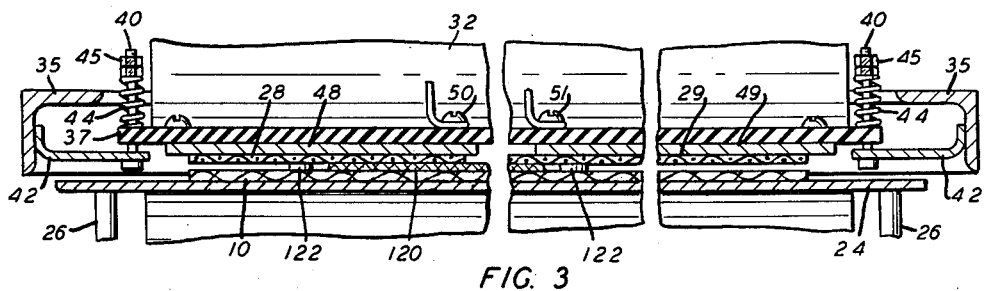
Fig. 3 is an enlarged fragmentary vertical section taken along line 3—3 of Fig. 1.

A transversely disposed, spring-pressed cross member 37, of insulating material (Fig. 3), is yieldably mounted between the drums 32 and 33 on bolts 40—40 slidably mounted within apertures formed in brackets 42—42, fixedly secured to the longitudinal members 35—35 of the frame assembly. Compression springs 44—44, mounted on the bolts 40—40 between the cross member 37 and adjustable lock nuts 45—45, urge the cross member 37 downwardly. Secured to the lower face of the cross member 37 are metallic contact shoes 48 and 49, which are pressed by the cross member into contact with the metallic belts 28 and 29, respectively. The contact shoes 48 and 49 serve a dual purpose in providing a resilient backing for pressing their associated metallic belts 28 and 29 into pressing contact with the conductive ends of a cord under test and providing the electrical contacts for a conductivity testing circuit hereinafter to be described. The electrical leads to the testing circuit are connected to terminals 50 and 51 of the shoes 48 and 49, respectively.

Positioned at the discharge end of the conveyer belt 10 are bins 52 and 53. The bin 52 is designed to receive cords which have been found to possess electrical continuity, whereas the bin 53 is adapted to receive defective cords. A vane 55 (Fig. 2) fixedly mounted on a rotatable rod 56 is designed to be selectively positioned so as to deflect cords which have been tested into either the bin 52 or the bin 53, depending upon the results of the continuity test. The rod 56 is positioned transversely between a pair of hanger plates, one of which designated 58 is shown, attached to the longitudinal members 15—15 of the frame assembly. The rod 56 is turned by means of a bell crank 60 secured to one end thereof, which projects beyond the plate 58.

One arm of the bell crank 60 is attached to a tension spring 62 anchored to the frame assembly by a lug 63. The spring 62 normally urges the rod 56 to an angular position wherein the vane 55 secured thereto occupies a vertical position. In this vertical position cords discharged by the belt 10 are deflected into the reject bin 53. A guide 65 positioned transversely between the longitudinal members 35—35 deflects the cords toward the vane 55.

The other arm of the bell crank 60 is attached to the plunger of a solenoid 67. Energization of the solenoid 67 operates the plunger in such a manner as to position the vane obliquely to the left, as seen in Fig. 2, and thereby to deflect cords being discharged by the belt 10 into the bin 52.

Figure 4:
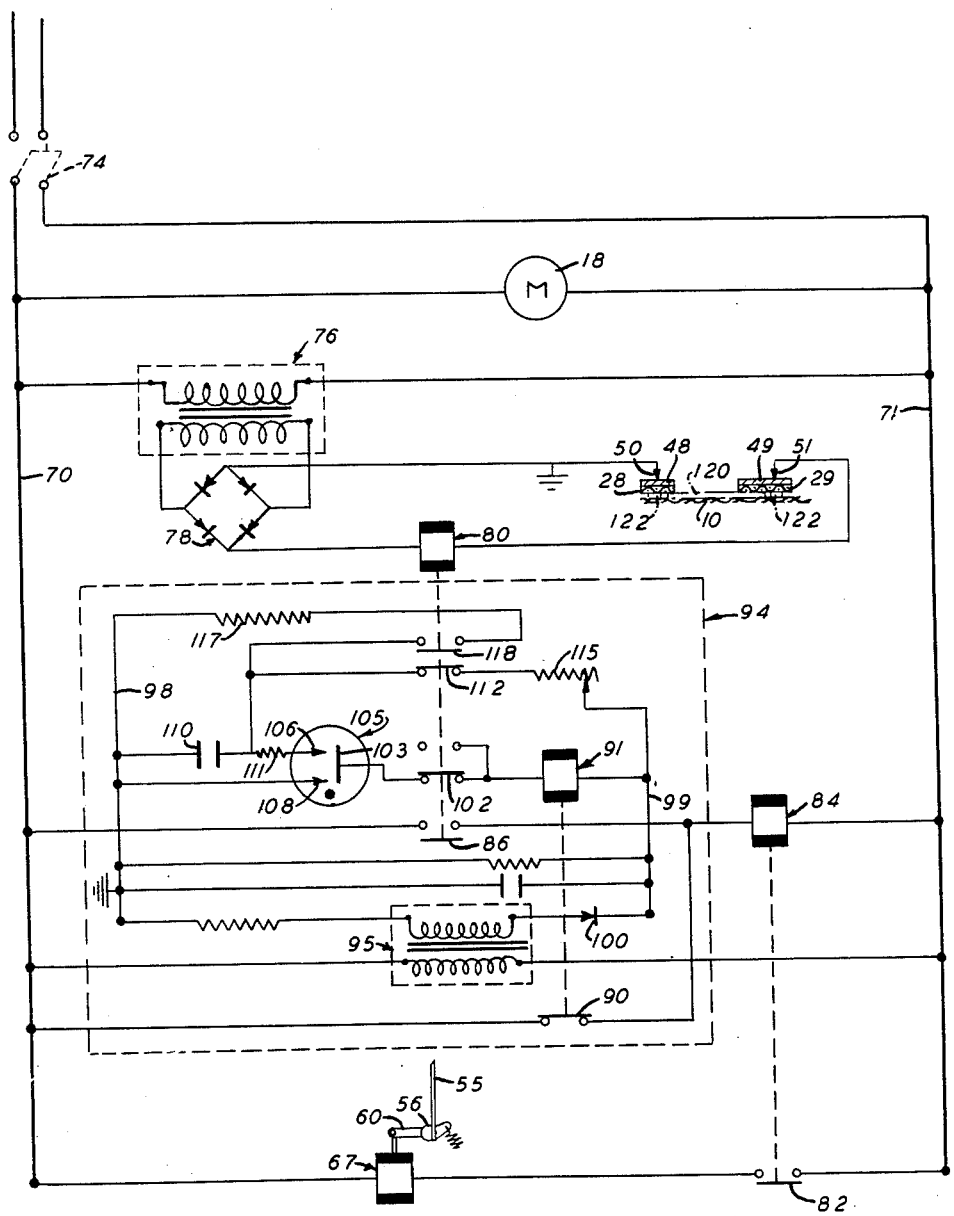
Fig. 4 is a schematic diagram showing an electrical control circuit forming a part of the apparatus.

An electric circuit for energizing the motor 18 and for controlling the position of the vane 55 is shown in Fig. 4. Main bus lines 70 and 71 are energized by closing a switch 74, which in turn energize the motor 18 connected across the bus lines 70 and 71. A transformer 76 has its primary winding connected across the bus lines 70 and 71, and its secondary winding connected to a bridge rectifier, shown generally at 78. The rectifier 78 feeds a circuit including the operating coil of a relay 80 and the contact shoes 48 and 49, electrically connected to the metallic belts 28 and 29, respectively. When the terminals 50 and 51 are effectively bridged by a continuous cord resting on the metallic belts 28 and 29, the circuit including the rectifier 78 and the operating coil of the relay 80 is completed to energize the relay 80.

The solenoid 67, which controls the positioning of the vane 55, has its operating coil connected across the bus lines 70 and 71 through a normally open contact 82 of a relay 84. The relay 84 has one side of its operating coil connected to the line 71 and the other side connected to the line 70 through a normally open contact 86 of the relay 80 and also through a normally closed contact 90 of a relay 91. Since the contact 90 shunts the contact 86, the relay 84 may be energized when a contact 90 is closed, even though the contact 86 is open.

The operating coil of the relay 91 is included in a time relay circut, shown generally at 94. The D. C. power for energizing the time delay circuit 94 is supplied from a transformer 95 having its primary winding connected across the bus lines 70 and 71, and its secondary winding feeding control circuit bus lines 98 and 99 through a half-wave rectifier 100. One side of the operating coil of the relay 91 is connected to the bus line 99 and the other side of the coil is connected through a normally closed contact 102 of the relay 80 to an anode 103 of a gas-filled cold cathode tube 105. The tube 105 has a control anode 106 and a cathode 108, which are connected across a condenser 110 of a predetermined value.

The cathode 108 and one side of the condenser 110 are connected to the negative bus line 98. The other side of the condenser 110 and the control anode 106, with a limiting resistance 111, are tied to the positive bus line 99 through a normally closed contact 112 of the relay 80 and a variable resistance 115. The condenser 110 is shunted by a condenser discharge circuit containing a damping resistance 117 and a normally open contact 118 of the relay 80.

*Operation*

To operate the aforementioned apparatus to perform continuity tests upon tipped cords, switch 74 is closed to energize the bus lines 70 and 71. Energization of the bus lines 70 and 71 in turn causes the energization of the constant speed motor 18 to continuously drive the conveyer belt 10 at a constant linear speed through the gear reducer 20 and gear train 22. Likewise, the drum 33 is driven by the motor 18 to drive the metallic belts 28 and 29 carried by the drum 33 and the drum 32. As previously stated, the metallic belts 28 and 29 are driven in a counterclockwise direction, as seen in Fig. 2, whereas the conveyer belt 10 is driven in a clockwise direction, so that their opposing faces are traveling in the same direction at the same linear speed.

Electrical cords having solderless conductive tips crimped about each end are fed individually at predetermined spaced intervals to the belt 10 and are oriented in generally transversely disposed positions. The continuously advancing belt 10 carries the cords under and into engagement with the continuously moving belts 28 and 29, which are urged into pressing electrical contact with the respective ends of the cords by the shoes 48 and 49, respectively, carried by the spring-pressed cross member 37. The electrical contacts between the conductive tips of the cord under test with the metallic belts 28 and 29, respectively, are continuous and remain unbroken until the cord reaches the point of tangency of the path of travel of the cord with the periphery of the drums 12 and 33 at the discharge end of the conveyer belt 10. A short distance beyond this point, the cord is carried by inertia from the belt 10 toward the vane 55, which is normally positioned vertically so as to deflect cords into the reject bin 53. The guide 65 prevents the cord from passing over the vane 55 when it is in its vertical position.

To illustrate fully the operation of the apparatus, let it be assumed that an insulated cord 120 having solderless conductive tips 122—122 and possessing electrical continuity has been deposited in a transversely disposed position upon the conveyer belt 10. The switch 74 had been closed previously to energize the bus lines 70 and 71 and the motor 18. After a short transient period, the condenser 110 reaches its maximum voltage and fires the tube 105 so as to permit conduction and current flow in the operating coil of the relay 91, which causes the contact 90 to open. In this starting condition, the solenoid 67 which operates the vane 55, is de-energized leaving the vane in its vertical position.

The conveyer belt 10 carries the tipped cord 120 under test between the continuously advancing metallic belts 28 and 29, and the conductive tips 122—122 on the ends of the cord are engaged by the contact shoes 48 and 49, respectively. Since we are assuming that this particular cord 120 is not defective, the terminals 50 and 51 (Fig. 4) are effectively bridged by the cord, thereby completing a circuit including the operating coil of the relay 80. The energization of the relay 80 opens the contacts 102 and 112 and closes the contacts 86 and 118 of the time delay circuit 94. The opening of contact 112 and the closing of contact 118 allows the condenser 110 to discharge itself completely by dissipating energy in the damping resistance 117. The opening of the contact 102 de-energizes the relay 91 to close the contact 90. The contact 86, closed by the energization of the relay 80, operates the relay 84 to energize the circuit branch which includes the solenoid 67, which in turn positions the vane obliquely to a position wherein the cord 120 will be deflected, when it is discharged from the belt 10, into the bin 52 for nondefective cords.

As previously stated, the bridging contact between the moving metallic belts 28 and 29 and the respective conductor tips of the cord 120, is maintained until the cord reaches a position at the point of tangency between the path of travel of the cord and the drums 12 and 33. When the cord passes this position, the bridging connection between the terminals 50 and 51 is broken, thereby de-energizing the relay 80, and closing the contacts 102 and 112 and opening the contacts 86 and 118. As soon as the contact 112 closes, the condenser 110 charges again to an effective maximum voltage sufficient to fire the tube 105. This charging time is selectively adjusted and preset by means of the variable resistance 115.

When the tube 105 conducts after the predetermined time delay, the operating coil of the relay 91, which is now connected to the anode 103 by the closed contact 102, is energized to de-energize the relay 84 and open contact 82. The opening of the contact 82 de-energizes the solenoid 67 and permits the vane to assume its normal vertical position. The time delay, which is determined by adjusting the variable resistance 115, is preset to allow the cord under test to pass the vane 55 before the solenoid 67 is de-energized. Therefore, sufficient time is allowed for the nondefective cord to be deflected by the obliquely positioned vane into the bin 52.

However, if the cord 120 under test proves to be noncontinuous, the circuit including the operating coil of relay 80 is never completed and the relay 80 remains inoperative. In this condition, the tube 105 continues to conduct and energize the relay 91, which holds the contact 90 open, thereby maintaining the relay 84 and the solenoid 67 inoperative. With the solenoid 67 deenergized, the vane 55 is in its vertical position and deflects the defective cord into the bin 53.

Continuity tests on tipped cords of varying lengths are facilitated by the novel moving metallic belt contact arrangement which has previously been described. The particular arrangement permits tests to be performed on cords of various lengths without requiring any compensatory adjustments and does not require accurate alignment of the individual cords, since it is only necessary that the cord be positioned so as to insure contacts between the conductive tips and portions of the metallic belts 28 and 29, respectively. In an actual testing apparatus, similar to the heretofore described embodiment of the invention, cords varying in length from three inches to twelve inches have been tested.

It is manifest that the invention is not limited to the heretofore described embodiment, and that various modifications thereof may be made within the spirit and scope of the invention.

What is claimed is:

1. Apparatus for testing the continuity of insulated electrical conductors, which comprises an endless conveyer belt for transporting such a conductor transversely disposed thereupon, means for advancing the conveyer belt, a pair of spacedly mounted spring-pressed electrical contactors normally electrically insulated from each other, said contactors being positioned above the belt and spaced therefrom so as to permit the passage of a conductor carried by the conveyer belt therebeneath while maintaining continuous electrical contacts simultaneously with the opposite ends of the conductor, a deflector vane pivotally mounted adjacent to the discharge end of the belt, and an electric circuit associated with said electrical contactors for positioning the vane so as to deflect such a conductor in a direction determined by the continuity of the conductor, said electrical circuit including a source of electromotive force.

2. Apparatus for testing the continuity of insulated electrical conductors, which comprises an endless conveyer belt for transporting such a conductor transversely disposed thereupon, means for continuously advancing the conveyer belt, an endless metallic contact belt positioned above the conveyer belt, a second endless metallic contact belt similarly mounted adjacent to the first metallic contact belt and normally electrically insulated therefrom, said contact belts being positioned so as to permit the passage of the conductor carried by the conveyer belt while simultaneously maintaining continuous electrical contacts with opposite ends of the conductor, an electrical circuit associated with said contact belts, said circuit including a source of electromotive force, and means actuated by said circuit when an electrically continuous conductor bridges the metallic belts to deflect such conductor in a predetermined direction as it is discharged from the conveyer belt.

3. Apparatus for testing the continuity of insulated electrical conductors, which comprises a pair of parallel, spaced, continuous belt-like metallic contact elements normally insulated from each other, means for continuously driving the contact elements in the same direction at equal speeds, a conveyer belt for carrying a conductor transversely disposed thereon into engagement with the contact elements, said elements simultaneously making electrical contacts with opposite ends of the conductor, resilient means for pressing the contact elements against the respective ends of the conductor, means for continuously advancing the conveyer belt at a linear speed equal to that of the contact elements and in a direction complementary thereto, an electrical circuit associated with said contact elements, said circuit including a source of electromotive force, and means actuated by said electrical circuit when an electrically continuous conductor bridges the metallic contact elements to deflect the conductor in a given direction as it is discharged from the end of the conveyer belt.

4. Apparatus for testing the continuity of insulated electrical cords having conductive tips, which comprises a pair of parallel, spaced, continuous belt-like metallic contact elements normally insulated from each other, means for continuously driving the contact elements in the same direction at equal linear speeds, a conveyer belt, means for continuously advancing the conveyer belt so as to carry a cord transversely disposed thereupon under and into engagement with the contact elements so that said elements simultaneously engage the conductive tips on opposite ends of the cord, an electrical circuit associated with said contact elements, said circuit including a source of electromotive force, and means actuated by said electrical circuit when the cord bridging the contact elements is electrically continuous to deflect the cord in a given direction as it is discharged from the end of the conveyer belt.

5. Apparatus for testing the continuity of insulated electrical conductors having conductive tips, which comprises a pair of parallel, spaced, continuous belt-like metallic contact elements normally insulated from each other, means for continuously driving the contact elements in the same direction at a constant linear speed, a continuous conveyer belt positioned beneath the contact elements, means for continuously advancing the conveyer belt at a linear speed equal to that of the contact elements so as to carry a transversely disposed conductor under and into engagement with the spaced contact elements, said elements simultaneously contacting the conductive tips on opposite ends of the conductor, a receptacle positioned at the discharge end of the conveyer, a vane movably mounted in the path of conductors discharged from the conveyer belt so as to normally prevent the conductors from entering the receptacle, an electrical circuit associated with said contact elements, said circuit including a source of electromotive force, and means actuated by the electrical circuit when the conductor bridging the contact element is electrically continuous to move the vane so as to deflect the conductor into the receptacle.

6. Apparatus for automatically testing the continuity of tipped, insulated electrical cords, which comprises a continuous conveyer belt for transporting a tipped cord disposed transversely thereupon, two parallel, spaced, continuous belt-like electrical contact elements normally insulated from each other and positioned above the conveyer belt intermediate of the loading and discharge ends thereof, said contact elements being spaced from the belt so as to permit the passage of a cord therebetween while maintaining continuous electrical contacts simultaneously with the opposite tipped ends of the cord and being of unequal widths so as to permit cords of various lengths to be tested, means for advancing the conveyer belt at a constant linear speed to carry the cord under and into engagement with the contact elements, means for driving the contact elements in a direction complementary to the moving conveyer belt at the same linear speed so as to cooperatively carry the cord therebetween, resilient means for pressing the moving contact elements firmly against the respective tips of the cord, a movable vane positioned at the discharge end of the conveyer belt, means for moving the vane, and an electrical circuit associated with said contact elements for actuating the vane when the cord bridging the contact elements is electrically continuous so as to position the vane to deflect the cord in a predetermined direction as it is discharged from the conveyer belt, said electrical circuit including a source of electromotive force.

7. Apparatus for automatically testing the continuity of tipped, insulated electrical cords, which comprises a continuous conveyer belt for transporting a tipped cord disposed transversely thereupon, two spaced, continuous belt-like contact elements normally insulated from each other and positioned above the conveyer belt intermediate of the loading and discharge ends thereof, said contact elements being spaced from the belt so as to permit the passage of a cord while maintaining continuous electrical contacts simultaneously with the opposite tipped ends of the cord, means for advancing the conveyer belt at a constant linear speed to carry the cord under and into engagement with the contact elements, means for driving the contact elements in a direction complementary to the moving conveyer belt at the same linear speed so as to cooperatively carry the cord therebetween, resilient means for pressing the moving contact elements firmly against the respective tips of the cord, an electrical circuit associated with said contact elements and including a source of electromotive force, and means actuated by said circuit when an electrically continuous conductor bridges the spaced metallic contact elements to deflect the conductor in a given direction as it is discharged from the conveyer belt.

8. Apparatus for automatically testing the continuity of tipped, insulated electrical cords, which comprises a continuous conveyer belt for transporting a tipped cord disposed transversely thereupon, two parallel spaced, continuous belt-like contact elements of unequal widths normally insulated from each other and positioned above the conveyor belt intermediate of the loading and discharge ends thereof, said contact elements being spaced from the belt so as to permit the passage of a cord while maintaining continuous electrical contacts simultaneously with the opposite tipped ends of the cord, means for advancing the conveyer belt at a constant linear speed to carry the cord under and into engagement with the contact elements, means for driving the contact elements in a direction complementary to the moving conveyer belt at the same linear speed so as to cooperatively carry the cord therebetween, resilient means for pressing the moving contact elements firmly against the respective tips of the cord, a receptacle positioned adjacent to the discharge end of the conveyer belt, a vane pivotally mounted in the path of cords discharged from the belt so as to normally prevent cords from falling into the receptacle, and an electrical circuit associated with said contact elements for actuating the vane when the cord bridging the contact elements is electrically continuous to deflect the cord into the receptacle, said electrical circuit including a source of electromotive force.

9. Apparatus for testing the continuity of insulated electrical conductor, which comprises a continuous conveyer belt for transporting a tipped insulated cord disposed transversely thereupon, a pair of drums mounted above the conveyer belt, a pair of metallic contact belts spacedly mounted on and designed to travel around the drums, said contact belts being normally insulated from each other, means for rotating one of the drums to continuously drive the contact belts around the drums, means for advancing the conveyer belt so as to carry the cord under and into engagement with the spaced metallic contact belts, said contact belts moving in a direction complementary to that of the conveyer belt at the same linear speed and spaced so as to contact simultaneously the opposite tipped ends of the cord, resilient means for pressing the moving contact belts into firm electrical contact with the tipped ends of the cord, a receptacle positioned adjacent to the discharge end of the conveyer belt, a solenoid-operated vane pivotally mounted in the path of cords discharged from the belt and positioned so as to normally prevent cords from falling into the receptacle, and an electrical circuit associated with said contact belts and the solenoid-operated vane for actuating the vane when the cord bridging the contact belts is electrically continuous, thereby deflecting the cord into the receptacle, said electrical circuit including a source of electromotive force.

References Cited in the file of this patent

UNITED STATES PATENTS

| | | |
|---|---|---|
| 1,123,703 | De Jeu | Jan. 5, 1915 |
| 1,308,063 | Gray | July 1, 1919 |
| 2,269,474 | Nordquist | Jan. 13, 1942 |
| 2,270,428 | Flint | Jan. 20, 1942 |